United States Patent
Lee

(10) Patent No.: US 9,621,692 B2
(45) Date of Patent: Apr. 11, 2017

(54) DISPLAY APPARATUS AND ELECTRONIC APPARATUS INCLUDING THE SAME

(71) Applicant: SAMSUNG DISPLAY CO., LTD., Yongin, Gyeonggi-Do (KR)

(72) Inventor: Sang-Wol Lee, Yongin (KR)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 189 days.

(21) Appl. No.: 14/251,106

(22) Filed: Apr. 11, 2014

(65) Prior Publication Data

US 2015/0043180 A1 Feb. 12, 2015

(30) Foreign Application Priority Data

Aug. 6, 2013 (KR) ........................ 10-2013-0093338

(51) Int. Cl.
H05K 7/02 (2006.01)
H04M 1/02 (2006.01)
G06F 1/16 (2006.01)

(52) U.S. Cl.
CPC ........ *H04M 1/0266* (2013.01); *G06F 1/1626* (2013.01); *G06F 1/1637* (2013.01); *H04M 1/0268* (2013.01)

(58) Field of Classification Search
CPC ............ H05K 7/02; G06F 1/16; G06F 1/1637
USPC ............................................ 361/679.21, 752
See application file for complete search history.

(56) References Cited

U.S. PATENT DOCUMENTS

2010/0253902 A1 10/2010 Yamazaki et al.
2011/0050657 A1 3/2011 Yamada
2012/0044224 A1* 2/2012 Michisaka .......... G09G 3/3426
                                                         345/207
2012/0162099 A1 6/2012 Yoo et al.
2012/0313905 A1 12/2012 Kang et al.
2013/0002133 A1 1/2013 Jin et al.
(Continued)

FOREIGN PATENT DOCUMENTS

JP          2010-262275       11/2010
JP          2011-47976        3/2011
KR     10-2012-0042799        5/2012
(Continued)

OTHER PUBLICATIONS

US Patent Application Publication No. US2010/0253902 ( for JP2010-262275).

(Continued)

*Primary Examiner* — Dion R Ferguson
*Assistant Examiner* — Mandeep S Buttar
(74) *Attorney, Agent, or Firm* — F. Chau & Associates, LLC

(57) ABSTRACT

A display apparatus includes a bezel in which a size of the bezel is reduced. The display apparatus includes a display panel in which both edges of the display panel are bent. A back supporting unit is disposed on the back of the display panel. The back supporting unit supports the center of the display panel. A side supporting unit is disposed on sides of the display panel. Both edges of the display panel are disposed between the back supporting unit and the side supporting unit. The display panel includes a display area and a peripheral area surrounding the display area. A portion of the display area is disposed between the back supporting unit and the side supporting unit.

23 Claims, 7 Drawing Sheets

(56) References Cited

U.S. PATENT DOCUMENTS

2014/0132481 A1* 5/2014 Bell ..................... H05K 5/0017
                                                   345/1.3
2014/0132488 A1* 5/2014 Kim ....................... H01L 51/52
                                                   345/76

FOREIGN PATENT DOCUMENTS

| KR | 10-2012-0072793 | 7/2012 |
| KR | 10-2012-0136743 | 12/2012 |
| KR | 10-2013-0007311 | 1/2013 |

OTHER PUBLICATIONS

US Patent Application Publication No. US20110050657 (for JP2011-47976).
US Patent Application Publication No. US2012/0162099 (for KR10-2012-0072793).
US Patent Application Publication No. US2012/0313905 (for KR10-2012-0136743).
US Patent Application Publication No. US2013/0002133 (for KR10-2013-0007311).

* cited by examiner

DISPLAY APPARATUS AND ELECTRONIC APPARATUS INCLUDING THE SAME

CROSS-REFERENCE TO RELATED APPLICATION

This application claims priority under 35 U.S.C. §119 to Korean Patent Application No. 10-2013-0093338, filed on Aug. 6, 2013, in the Korean Intellectual Property Office, the disclosure of which is incorporated by reference herein in its entirety.

1. Technical Field

Exemplary embodiments of the present invention relate to a display apparatus, and more particularly to an electronic apparatus including the display apparatus.

2. Discussion of Related Art

A display apparatus may include a display panel that includes a display area in the center and a peripheral area surrounding the display area. A wiring for applying electrical signals to the display area or a circuit including a thin film transistor (TFT) may be disposed in the peripheral area.

In a display apparatus, a dead space, which is a non-display region, may be wide. When the peripheral area, where the wiring for applying the electric signals to the display area or the circuit including the TFT is disposed, is wide, the dead space included in a front surface of the display apparatus may be wide. The wide dead space may cause an area of a bezel that supports the dead space to be wide.

SUMMARY

Exemplary embodiments of the present invention include a display apparatus in which an area of a bezel is reduced, and an electronic apparatus including the display apparatus.

Exemplary embodiments of the present invention will be set forth in the description which follows and, in part, will be apparent from the description, or may be learned by practice of the exemplary embodiments.

According to one or more exemplary embodiments of the present invention, a display apparatus includes a display panel including a first area, a second area located at a first side of the first area and a third area located at a second side of the first area, opposite to the first side. The first area is disposed between the second area and the third area. A front surface and a back surface are disposed over the first to third areas. A portion between the first and second areas is bent in a first direction. A portion between the first and third areas is bent in a second direction. The first direction is a same direction as the second direction. The second and third areas are bent in the same direction from the first area. A back supporting unit is disposed on a back surface of the display panel. The back supporting unit is in contact with the back surface of the display panel. The back supporting unit supports the first area of the display panel. A side supporting unit is disposed on the first and second sides of the display panel. The second and third areas of the display panel are between the back supporting unit and the side supporting unit. The display panel includes a display area and a peripheral area surrounding the display area. The display area is disposed over a portion of the second area that is near the first area, a portion of the third area that is near the first area, and the first area.

According to an exemplary embodiment of the present invention, an adhesive may be disposed between the back supporting unit and the display panel. The adhesive may be a double-sided adhesive tape.

According to an exemplary embodiment of the present invention, the side supporting unit may contact the front surface of the display panel. The side supporting unit may support the second and third areas of the display panel.

According to an exemplary embodiment of the present invention, a first surface of the side supporting unit corresponding to a portion of the first and second areas of the display panel and facing the display panel may be rounded. A second surface of the side supporting unit corresponding to a portion between the first and third areas of the display panel and facing the display panel may be rounded.

According to an exemplary embodiment of the present invention, a first edge of the back supporting unit facing the portion between the first and second areas of the display panel may be rounded. A second edge of the back supporting unit facing the portion between the first and third areas of the display panel may be rounded.

According to an exemplary embodiment of the present invention, the side supporting unit may include a first side supporting unit and a second side supporting unit. The second area of the display panel may be between the first side supporting unit and the back supporting unit. The third area of the display panel may be between the second supporting unit and the back supporting unit.

According to an exemplary embodiment of the present invention, he first side supporting unit may be in contact with the front surface of the display panel in the second area. The second side supporting unit may be in contact with the front surface of the display panel in the third area.

According to an exemplary embodiment of the present invention, the display panel may include a light-transmitting window corresponding to the first area of the display panel may be further included.

According to an exemplary embodiment of the present invention, the light-transmitting window may be attached to the display panel by a transparent adhesive.

According to an exemplary embodiment of the present invention, the light-transmitting window may include a first side end surface. The first side end surface may face the side supporting unit. The first side end surface may be perpendicular to the first area of the display panel. The side supporting unit may include a second side end surface. The second side end surface may face the first side end surface of the light-transmitting window.

According to an exemplary embodiment of the present invention, the first side end surface of the light-transmitting window may be in contact with the second side end surface of the side supporting unit.

According to an exemplary embodiment of the present invention, the second side end surface of the side supporting unit may be a portion of the side supporting unit that is nearest to a line that passes the center of the display panel. The second side end surface of the side supporting unit may be perpendicular to the first area of the display panel.

According to an exemplary embodiment of the present invention, the first side end surface of the light-transmitting window and the second side end surface of the side supporting unit may include a common material.

According to an exemplary embodiment of the present invention, the light-transmitting window and the side supporting unit may be integrally formed as one body.

According to an exemplary embodiment of the present invention, the light-transmitting window and the side supporting unit may be formed separately and welded to each other.

According to an exemplary embodiment of the present invention, a portion of the back supporting unit may include at least one concave portion.

According to an exemplary embodiment of the present invention, the display panel may include a printed circuit board or an electronic element disposed in the concave portion of the back supporting unit.

According to an exemplary embodiment of the present invention, the back supporting unit may include a first portion corresponding to the first area of the display panel and second portions corresponding to the side supporting unit. A portion of the back supporting unit between the first portion of the back supporting unit and the second portions of the back supporting unit may be bent.

According to an exemplary embodiment of the present invention, an electronic apparatus may include a display apparatus, described above.

BRIEF DESCRIPTION OF THE DRAWINGS

The above and other features of the present invention will become more apparent by describing in detail exemplary embodiments thereof, with reference to the accompanying drawings in which.

DETAILED DESCRIPTION

Figure 1:
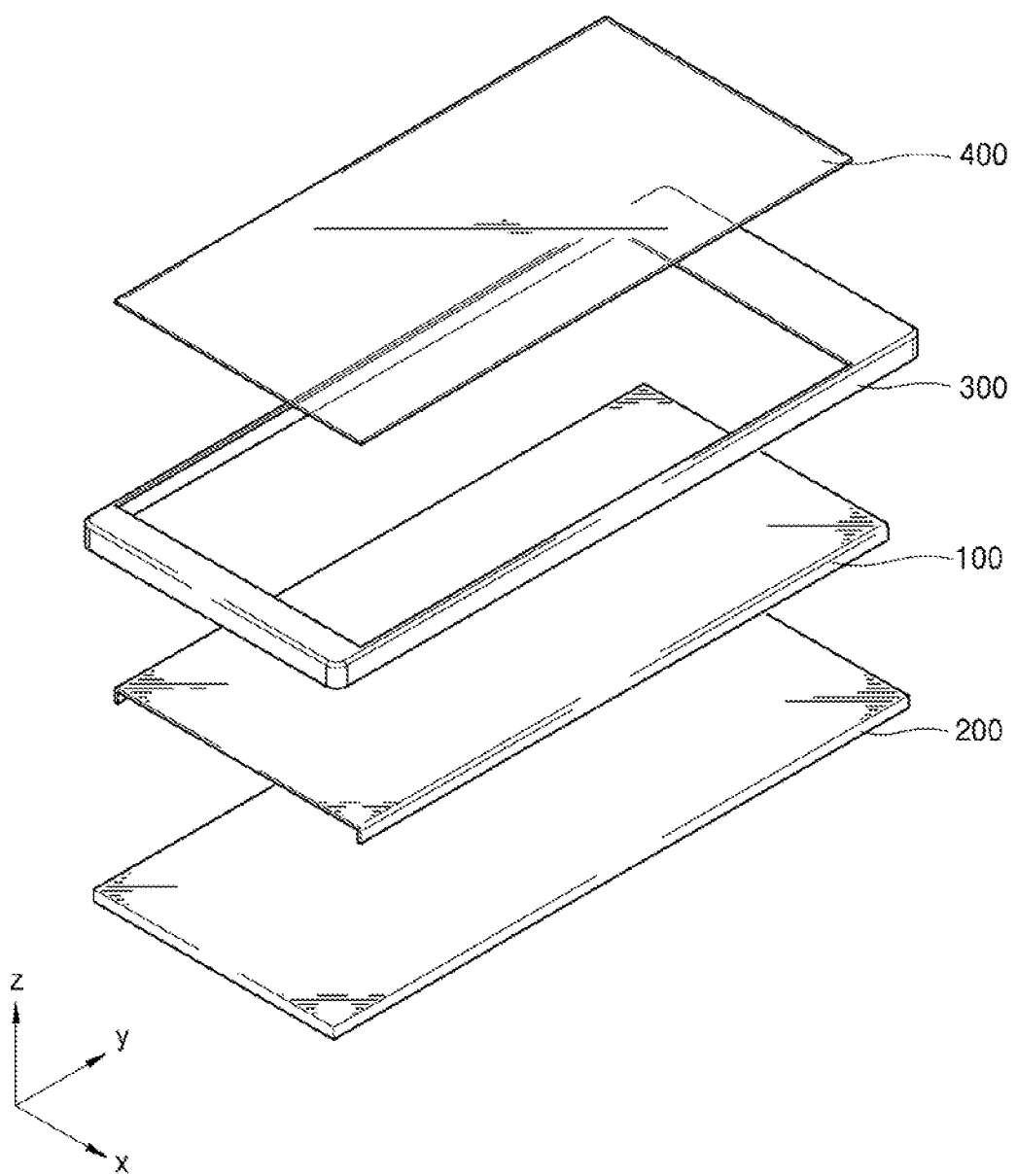
FIG. 1 a perspective view schematically illustrating a display apparatus according to an exemplary embodiment of the present invention.

Hereinafter, exemplary embodiments of the present invention will be described in detail with reference to the accompanying drawings. However, the present invention should not be construed as limited to the exemplary embodiments set forth herein and may be embodied in different forms. Sizes of elements in the drawings may be exaggerated for convenience of explanation. For example, sizes and thicknesses of components in the drawings may be illustrated for convenience of explanation, and the following exemplary embodiments are not limited thereto.

In the following exemplary embodiments, the x-axis, the y-axis, and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

It will be understood that when a layer, region, or component is referred to as being "formed on," another layer, region, or component, it can be directly or indirectly formed on the other layer, region, or component. For example, intervening layers, regions, or components may be present.

FIG. 1 a perspective view schematically illustrating a display apparatus according to an exemplary embodiment of the present invention. The display apparatus may include a display panel 100, a back supporting unit 200, and a side supporting unit 300. As illustrated in FIG. 1, the display apparatus may include a light-transmitting window 400.

The display panel 100 may include a first area A1 (refer to FIG. 5), a second area A2 (refer to FIG. 5) at a side (+x direction) of the first area A1, and a third area A3 (refer to FIG. 5) at an opposite side (−x direction) of the first area A1 so as to face the second area A2. As illustrated in FIG. 1, the display panel 100 may have a structure in which a portion between the first and second areas A1 and A2 or a vicinity of the portion is bent, and a portion between the first and third areas A1 and A3 or a vicinity of the portion is bent. The display panel 100 need not be exactly bent in the portion between the first and second areas A1 and A2, but may be bent in a portion of the first area A1 near the second area A2 or a portion of the second area A2 that is near the first area A1. The display panel 100 need not be exactly bent in the portion between the first and third areas A1 and A3, but in a portion of the first area A1 near the third area A3, or a portion of the third area A3 that is near the first area A1. The display panel 100 may have a structure in which the second and third areas A2 and A3 are bent in the same direction (−z direction) from the first area A1.

The back supporting unit 200 may be disposed on a back (−z direction) of the display panel 100, and may contact a back surface of the display panel 100. The back supporting unit 200 may support the first area A1 of the display panel 100. The side supporting unit 300 may be disposed on sides (e.g., +x direction and/or −x direction) of the display panel 100 so that the second and third areas A2 and A3 of the display panel 100 are between the back supporting unit 200 and the side supporting unit 300.

As illustrated in FIG. 1, the display panel 100 may have a structure in which the portion between the first and second areas A1 and A2 and the portion between the first and third areas A1 and A3 are bent. The portion between the first and second areas A1 and A2 and the portion between the first and third areas A1 and A3 may be naturally bent while the display apparatus is manufactured. The display panel 100 may be flexible, and may include a substrate including a material such as, for example, polyimide (PI) or polyethylene phthalate (PET).

Figure 2:
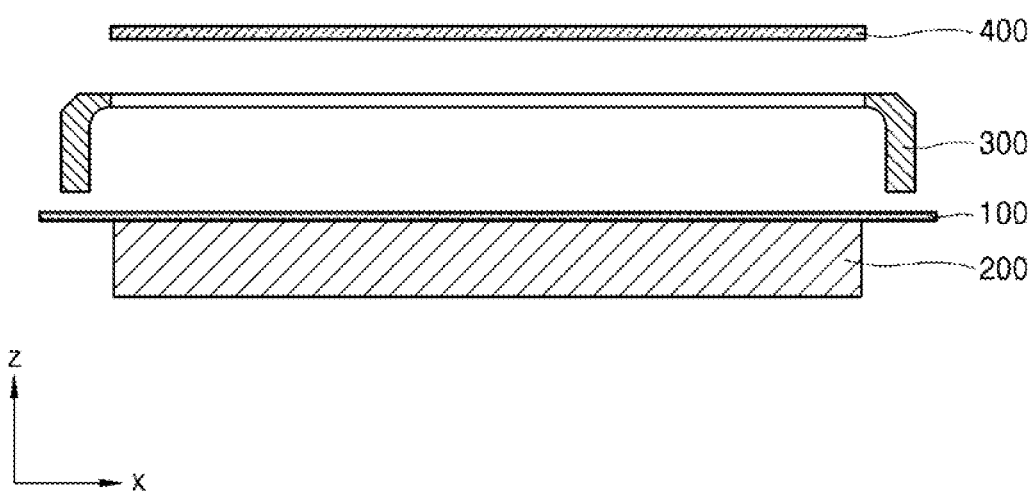
FIGS. 2 through 4 are cross-sectional views schematically illustrating processes of manufacturing a display apparatus, according to exemplary embodiments of the present invention.
Figure 3:
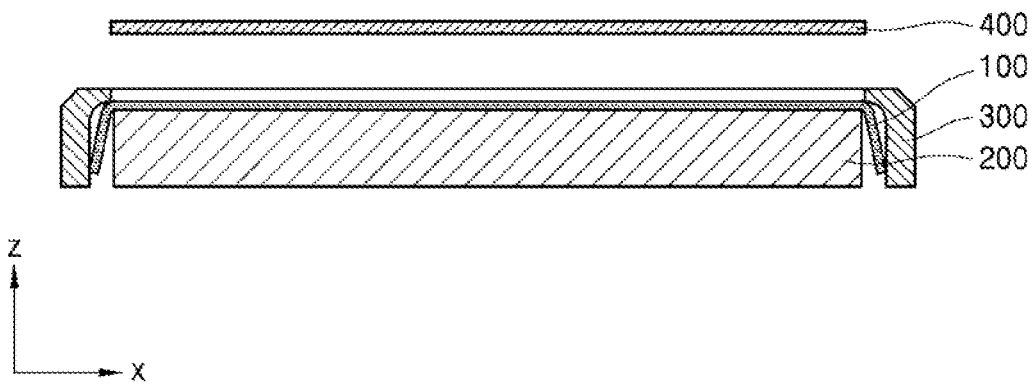
Figure 4:
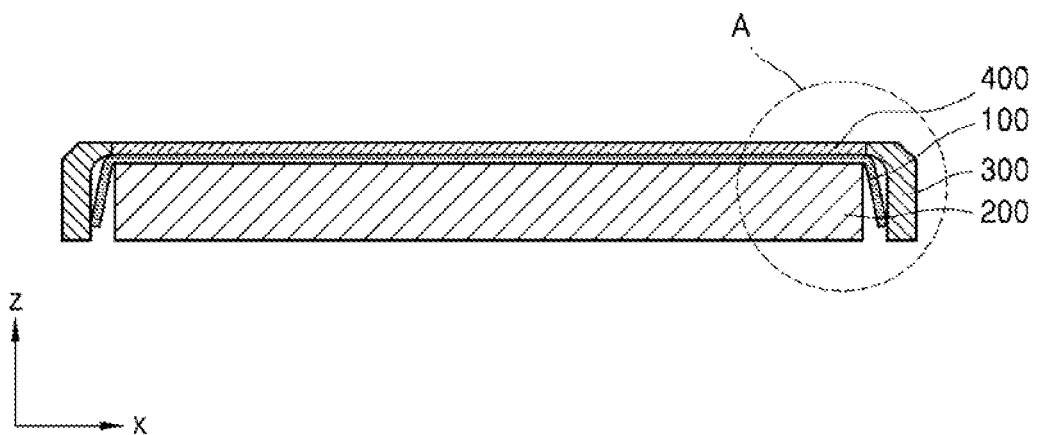

FIGS. 2 through 4 are cross-sectional views schematically illustrating processes of manufacturing a display apparatus, according to exemplary embodiments of the present invention. As illustrated in FIG. 2, the display panel 100, which is not bent, may be mounted on the back supporting unit 200. As illustrated in FIG. 3, the side supporting unit 300 may be moved from a top portion of the back supporting unit 200 in a direction (−z direction) of the back supporting unit 200, and may be coupled to the back supporting unit 200. During the coupling of the side supporting unit 300 to the back supporting unit 200, the display panel 100 having a flexible property may be naturally bent in the portion between the first and second areas A1 and A2 or in the vicinity of the portion, and the portion between the first and third areas A1 and A3 or in the vicinity of the portion. As illustrated in FIG. 4, the light-transmitting window 400 may be coupled to the display panel 100. In exemplary embodiments of the present invention, the side supporting unit 300 may be coupled to the back supporting unit 200 while the light-transmitting window 400 is coupled on the display panel 100.

Figure 5:
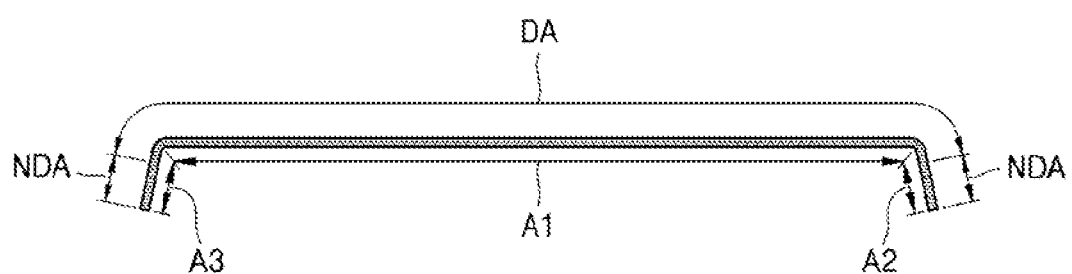
FIG. 5 is a cross-sectional view schematically illustrating a display panel of FIG. 4.

FIG. 5 is a cross-sectional view schematically illustrating the display panel 100 of FIG. 4. As illustrated in FIG. 5, the display panel 100 may include a display area DA and a peripheral area NDA surrounding the display area DA. The display area DA may be disposed over the portion of the second area A2 that is near the first area A1, the portion of the third area A3 that is near the first area A1, and the first area A1. A front surface of the display panel 100 need not be a dead space, but may be a displayable area. The first area A1 may be a portion other than bent edges of the display panel 100. The first area A1 need not be a dead space, and may be a displayable area. An area of the dead space, recognized by the user when looking at the front surface of the display apparatus, may be reduced.

Referring to FIGS. 3 and 4, it is illustrated that a distance between the back supporting unit 200 and the side supporting unit 300 is relatively long. For convenience of description, it is illustrated that a bending angle of the first and second areas A1 and A2 of the display panel 100 may be greater than 90°. For example, the bending angle of the first and second areas A1 and A2 of the display panel 100 may be approximately 90°. For example, the bending angle of the first and second areas A1 and A2 of the display panel 100 may be approximately 90° by reducing the distance between the back supporting unit 200 and the side supporting unit 300.

The side supporting unit 300 may contact a front surface 100F of the display panel 100. The side supporting unit 300 may support the second and third areas A2 and A3 of the display panel 100. The side supporting unit 300 may contact a portion of the front surface 100F of the display panel 100. As illustrated in FIGS. 3 and 4, for example, a contact area of the side supporting unit 300 and the front surface 100F of the display panel 100 may be relatively small, or the side supporting unit 300 may line contact the front surface 100F of the display panel 100. When the bending angle of the first and second areas A1 and A2 of the display panel 100 is substantially close to 90°, the contact area of the side supporting unit 300 and the display panel 100 may be relatively large, and the side supporting unit 300 may contact the front surface 100F of the display panel 100.

Figure 6:
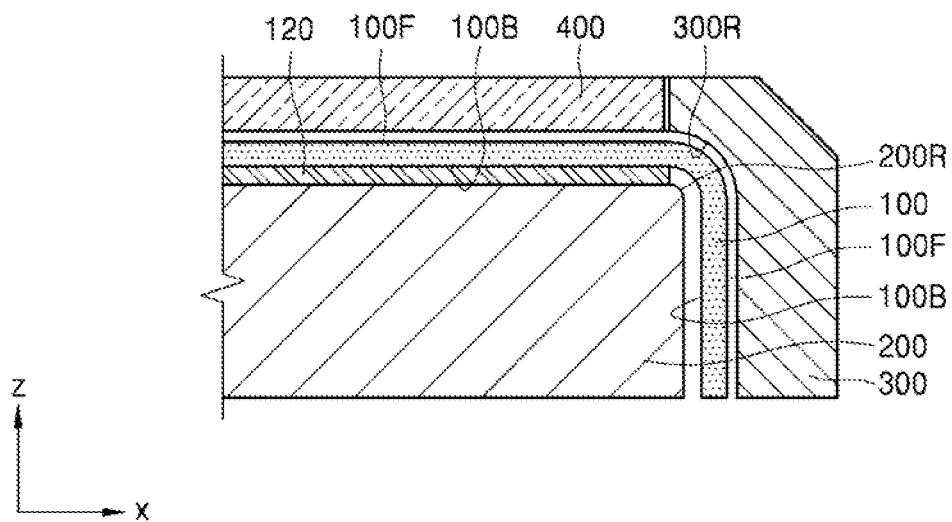
FIG. 6 is a cross-sectional view schematically illustrating a portion A of FIG. 4.

FIG. 6 is a cross-sectional view schematically illustrating a portion A of FIG. 4. As illustrated in FIG. 6, the display panel 100 may include the front surface 100F and a back surface 100B over the first to third areas A1 to A3. The display panel 100 may include an adhesive 120. The adhesive 120 may be disposed between the back supporting unit 200 and the display panel 100.

As described above with reference to FIGS. 2 and 3, for example, the display panel 100, which is not bent, may be mounted on the back supporting unit 200. Then, the side supporting unit 300 may be moved from the top portion of the back supporting unit 200 in the direction (−z direction) of the back supporting unit 200, and may be coupled to the back supporting unit 200. During the coupling process described above, the display panel 100 having a flexible property may be naturally bent at the portion between the first and second areas A1 and A2 or in the vicinity of the portion between the first and second areas A1 and A2. During the coupling process described above, the display panel 100 having a flexible property may be naturally bent at the portion between the first and third areas A1 and A3 or in the vicinity of the portion between the first and third areas A1 and A3. During a process of bending the display panel 100, if a location of the display panel 100 is changed, the display panel 100 need not be bent at a predetermined location, but may be bent at another location. During the process of bending the display panel 100, the center of the display panel 100 may be separated from the back supporting unit 200. Even in a manufactured display apparatus, the back surface 100B of the center of the display panel 100 need not contact the back supporting unit 200, but may be separated from the back supporting unit 200.

When the adhesive 120 is disposed between the back supporting unit 200 and the display panel 100, a location of the display panel 100 with respect to the back supporting unit 200 may be prevented from being changed during the process of bending the display panel 100. In the manufactured display apparatus, the back surface 100B of the center of the display panel 100 may contact the back supporting unit 200.

The adhesive 120 may be a double-sided adhesive tape, for example. A double-sided adhesive tape may fix the display panel 100 to the back supporting unit 200, and allow the display panel 100 to be separated from the back supporting unit 200 during a process of manufacturing the display apparatus or during maintenance.

The adhesive 120 may be disposed between the second area A2 of the display panel 100 and the back supporting unit 200, and between the third area A3 of the display panel 100 and the back supporting unit 200.

As illustrated in FIG. 6, a surface 300R of the side supporting unit 300 corresponding to a portion between the first and second areas A1 and A2 of the display panel 100 and facing the display panel 100; and a surface of the side supporting unit 300 corresponding to a portion between the first and third areas A1 and A3 of the display panel 100 and facing the display panel 100 may be round. When the display panel 100 is bent during the process of coupling the back supporting unit 200 and the side supporting unit 300, a bent portion of the flexible display panel 100 may contact and smoothly curve along the rounded surface 300R of the side supporting unit 300. When the display panel 100 is bent according to the process described above, the display panel 100 may be substantially prevented from being damaged due to sharply curving.

An edge 200R of the back supporting unit 200 facing the portion between the first and second areas A1 and A2 of the display panel 100; and an edge of the back supporting unit 200 facing the portion between the first and third areas A1 and A3 of the display panel 100 may be round. When the display panel 100 is bent during the process of coupling the back supporting unit 200 and the side supporting unit 300, the bent portion of the flexible display panel 100 may contact the round edge 200R of the side supporting unit 300. The back surface 100B of the display panel 100 may smoothly curve along the round edge 200R. When the display panel 100 is bent according to the process described above, the display panel 100 may be substantially prevented from being damaged due to sharply curving.

The light-transmitting window 400 may correspond to the first area A1 of the display panel 100. The light-transmitting window 400 may protect the display panel 100 from the outside, and/or may function as an anti-reflection film. The light-transmitting window 400 may be, for example, a type of film such as PI or PET, or a hard material such as glass or acryl. The light-transmitting window 400 may be attached to surface contact the display panel 100 as an optically clear adhesive (OCA).

Figure 7:
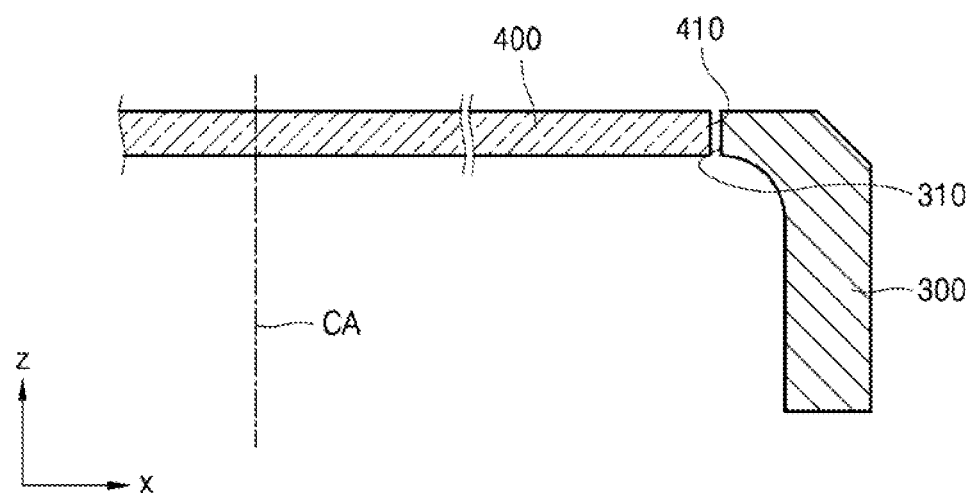
FIG. 7 is a cross-sectional view schematically illustrating a portion of a display apparatus, according to an exemplary embodiment of the present invention.

As illustrated in FIG. 7, the light-transmitting window 400 may include a side end surface 410 that is perpendicular to the first area A1 of the display panel 100. The side end surface 410 may be disposed to face the side supporting unit 300. The side supporting unit 300 may include a side end surface 310 that corresponds to the side end surface 410 of the light-transmitting window 400. The light-transmitting window 400 may contact the side supporting unit 300. The side end surface 410 of the light-transmitting layer 400 facing the side supporting unit 300 may contact the corresponding side end surface 310 of the side supporting unit 300.

Figure 8:
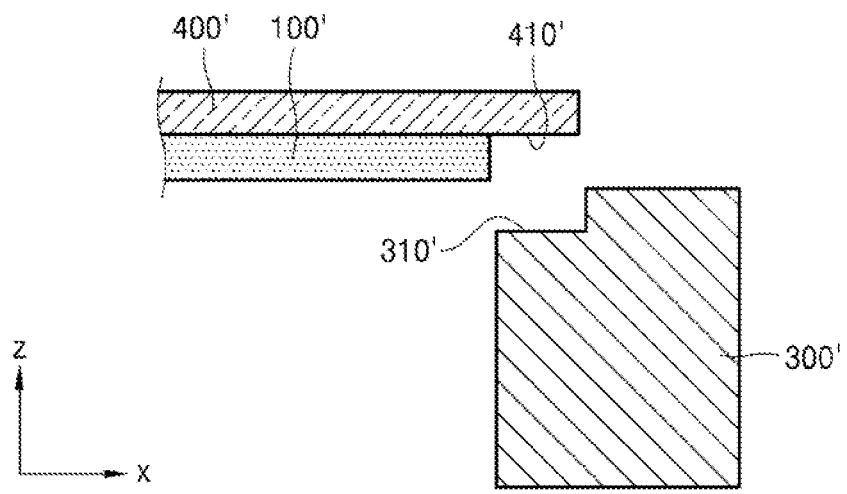
FIGS. 8 and 9 are cross-sectional views schematically illustrating processes of manufacturing a display apparatus.
Figure 9:
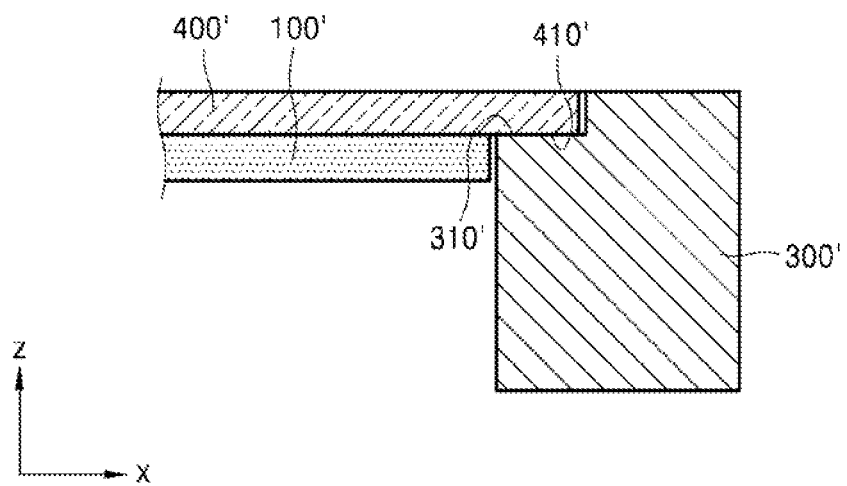

FIGS. 8 and 9 are cross-sectional views schematically illustrating processes of manufacturing a display apparatus. As illustrated in FIGS. 8 and 9, in the processes of manufacturing the display apparatus, a light-transmitting window 400' may be attached to a display panel 100' and a bezel 300'. A bent portion for mounting the light-transmitting window 400' may be provided on the bezel 300'. A bottom surface 410' (disposed in a −z direction) of an edge of the light-transmitting window 400' may contact and be coupled to a top surface (disposed in a +z direction) 310' of the bent portion of the bezel 300'. An adhesive may be disposed between the bottom surface 410' (disposed in a −z direction) of the edge of the light-transmitting window 400' and the top surface 310' (disposed in a +z direction) of the bent portion of the bezel 300'.

In this processes of manufacturing the display apparatus, an area of the bezel 300' (toward an x-axis) may be relatively large. For convenience of description, FIGS. 8 and 9 illustrate a contact area of the bottom surface 410' of the light-transmitting window 400' and the top surface 310' of the bezel 300' that is relatively small. In order to obtain sufficient contact areas so that the bezel 300' may sufficiently support and effectively contact the light-transmitting window 400', the contact area of the bottom surface 410' of the light-transmitting window 400' and the top surface 310' of the bezel 300' may be increased. Accordingly, the area of the bezel 300' (toward the x-axis) may be increased.

In the display apparatus according to exemplary embodiments of the present invention, the side end surface 410 of the light-transmitting window 400 facing the side supporting unit 300 alone may contact the corresponding side end surface 310 of the side supporting unit 300. The side supporting unit 300 need not directly support the light-transmitting window 400, because the light-transmitting window 400 may be attached to the display panel 100 that is supported by the back supporting unit 200. In the display apparatus according to exemplary embodiments of the present invention, a width of the side supporting unit 300 (toward the x-axis) may be reduced, and the area of the dead space, recognized by the user, for example, when looking at the front surface of the display apparatus, may be reduced.

As illustrated in FIG. 1, the first area A1 of the display panel 100 may have a rectangular shape, elongated toward a y-axis. A shape of the light-transmitting window 400 may be similar to the shape of the first area A1. The side end surface 310 of the side supporting unit 300 corresponding to the side end surface 410 of the light-transmitting window 400 may be a portion of the side supporting unit 300 which is nearest to a line CA (refer to FIG. 7) passing the center of the display panel 100. The side end surface 310 of the side supporting unit 300 may be perpendicular to the first area A1 of the display panel 100.

Figure 10:
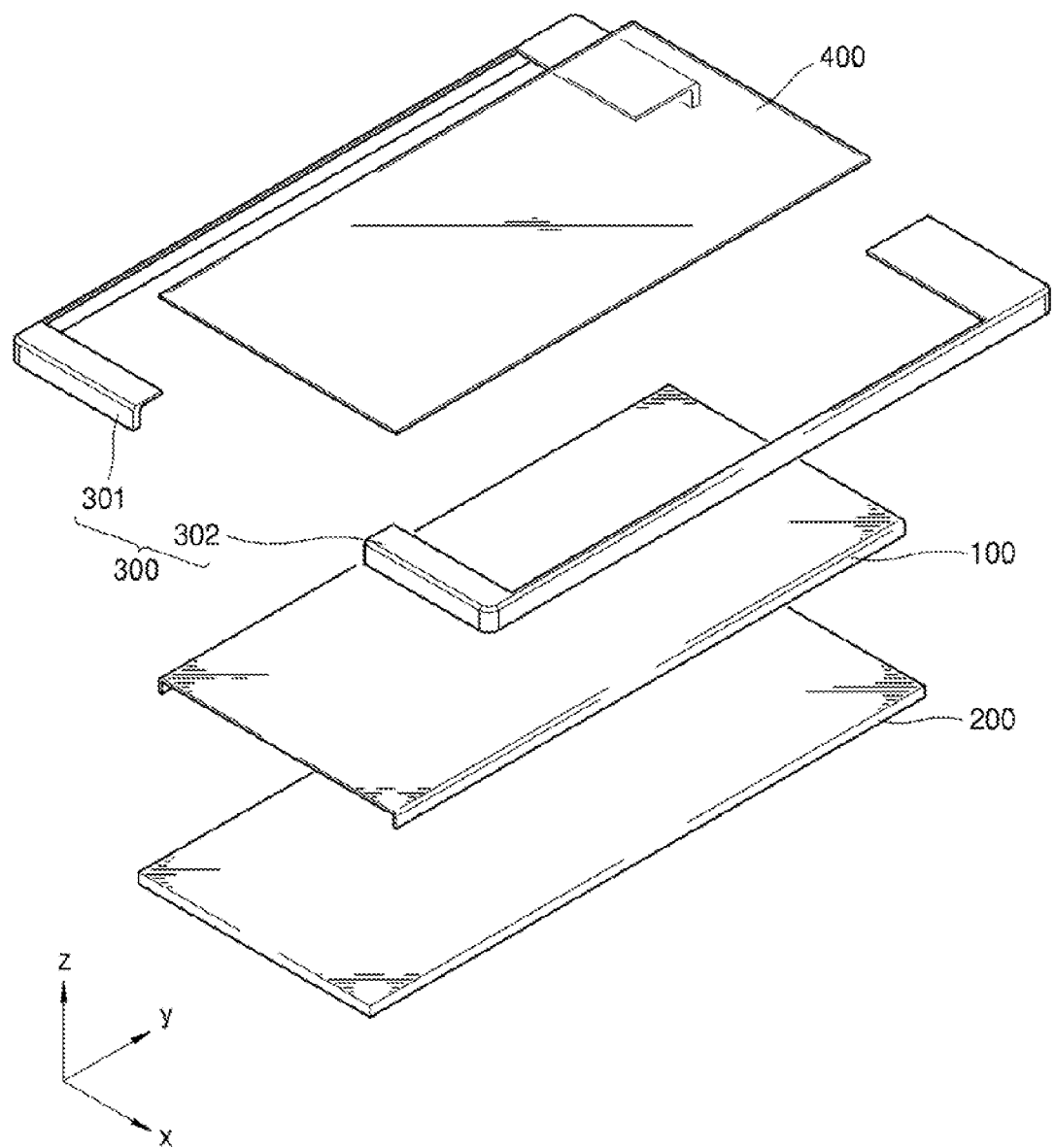
FIG. 10 is an exploded perspective view schematically illustrating a display apparatus, according to an exemplary embodiment of the present invention.

FIG. 10 is an exploded perspective view schematically illustrating a display apparatus according to an exemplary embodiment of the present invention. In a display apparatus according to an exemplary embodiment of the present invention, the side supporting unit 300 may include a first side supporting unit 301 and a second side supporting unit 302. The first side supporting unit 301 may be disposed so that the second area A2 of the display panel 100 is between the first side supporting unit 301 and the back supporting unit 200. The second supporting unit 302 may be disposed so that the third area A3 of the display panel 100 is between the second supporting unit 302 and the back supporting unit 200. The first side supporting unit 301 may contact the front surface 100F of the display panel 100 in the second area A2, and the second side supporting unit 302 may contact the front surface 100F of the display panel 100 in the third area A3.

When the side supporting unit 300 is coupled to the back supporting unit 200, the side supporting unit 300 need not be coupled to the back supporting unit 200 by being moved from the top portion of the back supporting unit 200 in the direction (−z direction) of the back supporting unit 200, as illustrated, for example, in FIGS. 2 and 3. The first side supporting unit 301 may be moved from a side (+x direction) of the back supporting unit 200 in a direction (−x direction) of the back supporting unit 200. The first side supporting unit 301 may be coupled to the back supporting unit 200. The second side supporting unit 302 may be moved from the other side (−x direction) of the back supporting unit 200 in a direction (+ direction) of the back supporting unit 200. The second side supporting unit 302 may be coupled to the back supporting unit 200.

In the display apparatus according to exemplary embodiments of the present invention, when the side supporting unit 300 is coupled to the back supporting unit 200, the portion between the first and second areas A1 and A2 of the display panel 100 and the portion between the first and third areas A1 and A3 of the display panel 100 need not be simultaneously bent, but may be individually bent. An amount of power for bending the portion between the first and second areas A1 and A2 of the display panel 100 or the portion between the first and third areas A1 and A3 of the display panel 100 may be smaller than an amount of power for simultaneously bending both portions. Accordingly, the display panel 100 may be easily bent.

The surface 300R of the first side supporting unit 301 facing the display panel 100 and corresponding to the portion between the first and second areas A1 and A2 of the display panel 100; and the surface 300R of the second side supporting unit 302 facing the display panel 100 and corresponding to the portion between the first and third areas A1 and A3 of the display panel 100 may be round. When the first side supporting unit 301 is moved from the side (+x direction) of the back supporting unit 200 in the direction (−x direction) of the back supporting unit 200 and is coupled to the back supporting unit 200, the second area A2 of the display panel 100 may smoothly curve along a round inner surface of the first side supporting unit 301. When the second side supporting unit 302 is moved from the other side (−x direction) of the back supporting unit 200 in the direction (+x direction) of the back supporting unit 200 and is coupled to the back supporting unit 200, the third area A3 of the display panel 100 may smoothly curve along a round inner surface of the second side supporting unit 302.

The side end surface 410 of the light-transmitting window 400 facing the side supporting unit 300 and the corresponding side end surface 310 of the side supporting unit 300 may include the same material. The light-transmitting window 400 and the side supporting unit 300 may be integrally formed using the same material. For example, the light-transmitting window 400 and the side supporting unit 300 may be integrally formed using a light-transmitting material. The light-transmitting window 400 and the side supporting unit 300 may be opaque due to a post-processing method such as painting or deposition, for example.

However, exemplary embodiments of the present invention are not limited thereto. The light-transmitting window 400 may be inserted into a metal mold and form the side supporting unit 300 through injection or casting. The light-transmitting window 400 and the side supporting unit 300 may be integrally formed. The light-transmitting window 400 and the side supporting unit 300 need not be formed using the same material. The light-transmitting window 400 and the side supporting unit 300 may be separately formed and then integrally combined by being welded to each other.

Figure 11:
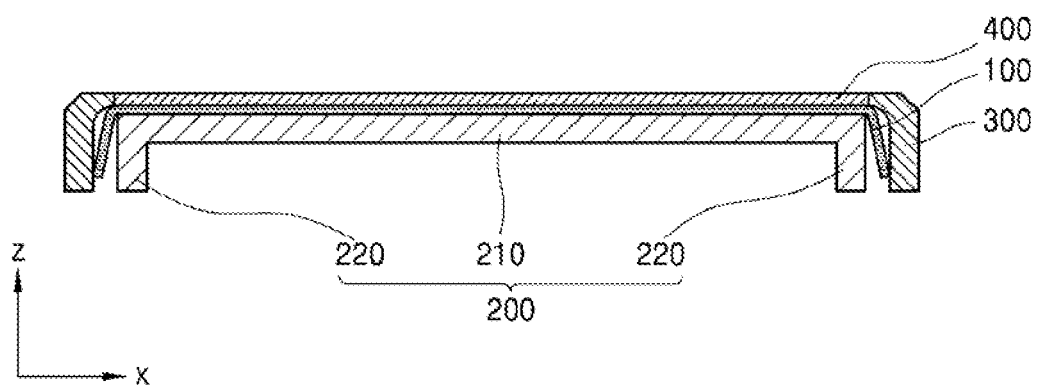
FIG. 11 is a cross-sectional view schematically illustrating a display apparatus, according to an exemplary embodiment of the present invention.

FIG. 11 is a cross-sectional view schematically illustrating a display apparatus, according to an exemplary embodiment of the present invention. In the display apparatus according to exemplary embodiments of the present invention, the back supporting unit 200 may include a first portion 210 and a second portion 220. The first portion 210 may correspond to the first area A1 of the display panel 100. The second portion 220 may correspond to the side supporting unit 300. The back supporting unit 200 may be bent between the first and second portions 210 and 220. An empty space may be provided in the back (−z direction) of the side supporting unit 200. A printed circuit board and/or an electronic element may be provided in the empty space. An overall thickness or volume of the display apparatus may be reduced.

The back supporting unit 200 of exemplary embodiments of the present invention is not necessarily limited to the form illustrated in FIG. 11, and may be modified in various ways. For example, a portion of the back supporting unit 200 that is positioned away from the display panel 100 may include at least one concave portion. The printed circuit board and/or the electronic element may be disposed in the concave portion.

Although a display apparatus is described above, exemplary embodiments of the present invention are not limited thereto. For example, electronic devices such as smartphones or tablet devices including a display apparatus are also in the scope of the present invention. The display panel 100 may be a touch panel, or the display panel 100 may have a touch function, for example.

As described above, according to exemplary embodiments of the present invention, a display apparatus in which an area of a bezel is reduced, and an electronic apparatus including the display apparatus may be provided. However, the scope of the present invention is not limited thereto.

While the present invention has been shown and described with reference to the exemplary embodiments thereof, it will be apparent to those of ordinary skill in the art that various changes in form and detail may be made thereto without departing from the spirit and scope of the present invention.

What is claimed is:

1. A display apparatus comprising: a display panel including a first area, a second area located at a first side of the first area, a third area located at a second side of the first area, opposite to the first side, so that the first area is disposed between the second area and the third area, and a front surface and a back surface disposed over the first to third areas, wherein a portion of the display panel between the first and second areas is bent in a first direction and a portion of the display panel between the first and third areas is bent in a second direction, the first direction being a same direction as the second direction; a back supporting unit disposed on a back surface of the display panel in the first area of the display panel, wherein the back supporting unit is in contact with connected to the back surface of the display panel in the first area of the display panel by an adhesive, and the back supporting unit supports the first area of the display panel, and wherein the back surface of the display panel is separated from the back supporting unit in the second and third areas of the display panel by a gap and wherein a portion of the back supporting unit includes at least one concave portion; a side supporting unit disposed on the first and second sides of the display panel, the second and third areas of the display panel being disposed between the back supporting unit and the side supporting unit; wherein the display panel includes a display area and a peripheral area surrounding the display area, and wherein the display area is disposed over a portion of the second area that is near the first area, a portion of the third area that is near the first area, and the first area; and a light transmitting window disposed on the display panel, wherein the light-transmitting window includes a first side end surface facing a second side end surface of the side supporting unit in the display area of the display panel.

2. The display apparatus of claim 1, wherein the adhesive is a double-sided adhesive tape.

3. The display apparatus of claim 1, wherein the side supporting unit contacts the front surface of the display panel, and the side supporting unit supports the second and third areas of the display panel.

4. The display apparatus of claim 3, wherein a first surface of the side supporting unit corresponding to a portion of the first and second areas of the display panel and facing the display panel; and a second surface of the side supporting unit corresponding to a portion between the first and third areas of the display panel and facing the display panel, are rounded.

5. The display apparatus of claim 1, wherein a first edge of the back supporting unit facing the portion between the first and second areas of the display panel, and a second edge of the back supporting unit facing the portion between the first and third areas of the display panel are rounded.

6. The display apparatus of claim 1, wherein the side supporting unit includes a first side supporting unit and a second side supporting unit, wherein the second area of the display panel is between the first side supporting unit and the back supporting unit, and wherein the third area of the display panel is between the second supporting unit and the back supporting unit.

7. The display apparatus of claim 6, wherein the first side supporting unit is in contact with the front surface of the display panel in the second area, and the second side supporting unit is in contact with the front surface of the display panel in the third area.

8. The display apparatus of claim 1, wherein the light-transmitting window is attached to the display panel by a transparent adhesive.

9. The display apparatus of claim 8, wherein the first and second side end surfaces are substantially perpendicular to the first area of the display panel.

10. The display apparatus of claim 8, wherein the first side end surface of the light-transmitting window is in contact with the second side end surface of the side supporting unit.

11. The display apparatus of claim 10, wherein the second side end surface of the side supporting unit is a portion of the side supporting unit that is nearest to a line that passes the center of the display panel.

12. The display apparatus of claim 9, wherein the first side end surface of the light-transmitting window and the second side end surface of the side supporting unit include a common material.

13. The display apparatus of claim 12, wherein the light-transmitting window and the side supporting unit are integrally formed as one body.

14. The display apparatus of claim 8, wherein the light-transmitting window and the side supporting unit are formed separately and welded to each other.

15. The display apparatus of claim 1, further comprising a printed circuit board or an electronic element disposed in the at least one concave portion of the back supporting unit.

16. The display apparatus of claim 1, wherein the back supporting unit includes a first portion corresponding to the first area of the display panel and second portions corresponding to the side supporting unit, and a portion of the back supporting unit between the first portion of the back supporting unit and the second portions of the back supporting unit is bent.

17. An electronic apparatus comprising the display apparatus of claim 1.

18. A display apparatus, comprising: a display panel including a first area, a second area positioned at a first end of the display panel and a third area positioned at an opposite end of the display panel from the second end, wherein the display panel has a first bend at a junction of the first area and the second area, and a second bend at a junction of the first area and the third area; a back supporting unit including a first portion configured to support the first area of the display panel and second portions corresponding to the second and third areas of the display panel, respectively, wherein the second portions of the back supporting unit are perpendicular to the first portion of the back supporting unit, wherein the first portion of the back supporting unit is connected to a back surface of the display panel in the first area of the display panel by an adhesive, and wherein the back surface of the display panel is separated from the second portions of the back supporting unit in the second and third areas of the display panel by a gap and wherein the back supporting unit further comprises one or more concave portions; a side supporting unit coupled to the display panel, wherein the side supporting unit is configured to provide a space between the side supporting unit and the second portions of the back supporting unit, and the second and third areas of the display panel are disposed in the space; and a light-transmitting window disposed over the first area of the display panel, wherein the light-transmitting window includes a first side end surface facing a second side end surface of the side supporting unit in a display area of the display panel.

19. The display apparatus of claim 18, wherein the back supporting unit comprises one or more concave portions configured to house a printed circuit board or an electronic element.

20. The display apparatus of claim 18, wherein the light-transmitting window and the side supporting unit are formed as a single body.

21. The display apparatus of claim 18, wherein the display panel further comprises a peripheral area surrounding the display area.

22. The display apparatus of claim 1, wherein the adhesive is absent from the gap in the second and third areas of the display panel.

23. The display apparatus of claim 18, wherein the adhesive is absent from the gap in the second and third areas of the display panel.

* * * * *